Figure 1:
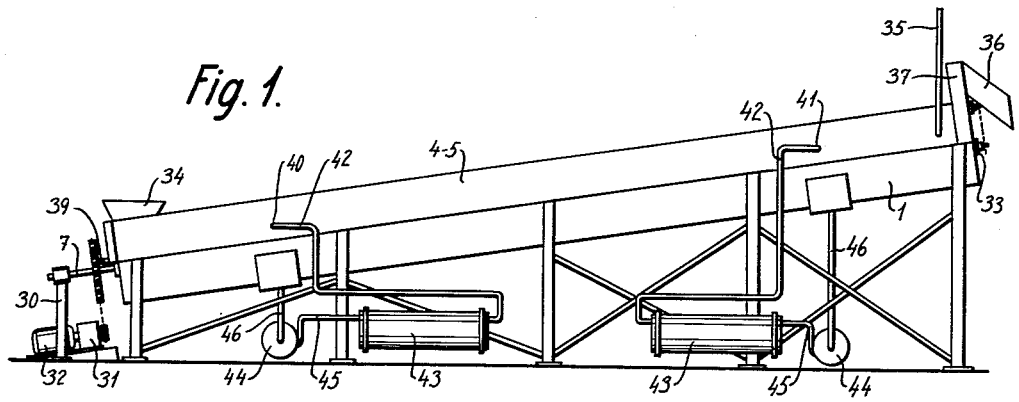

July 12, 1955  H. A. BRÜNICHE-OLSEN  2,713,009
PROCESS AND APPARATUS FOR THE COUNTER-CURRENT
LIXIVIATION OF SOLID MATERIAL
Filed April 23, 1951  2 Sheets-Sheet 1

INVENTOR
Henning A. Brünische-Olsen
BY Watson, Cole, Grindle &
Watson
ATTORNEYS

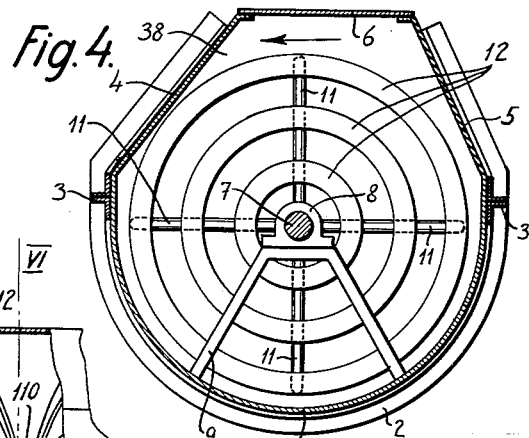
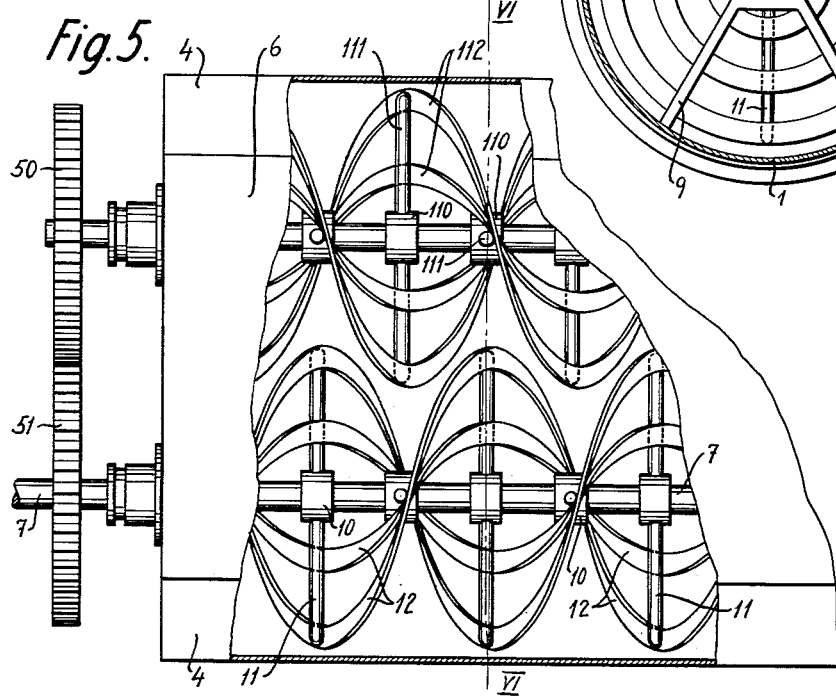
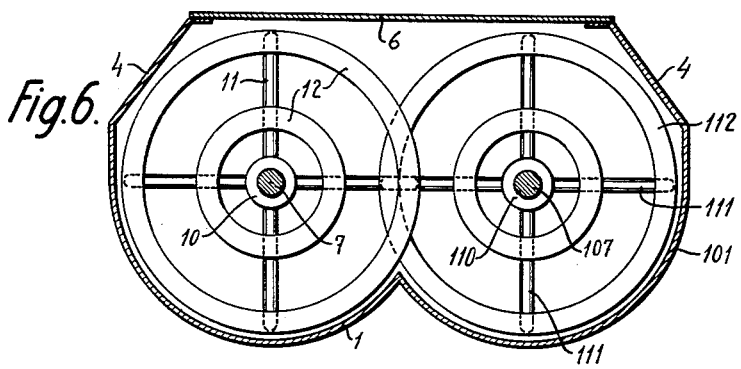

United States Patent Office 2,713,009
Patented July 12, 1955

2,713,009

PROCESS AND APPARATUS FOR THE COUNTER-CURRENT LIXIVIATION OF SOLID MATERIAL

Henning Anton Brüniche-Olsen, Gentofte, Denmark, assignor to Aktieselskabet de Danske Sukkerfabrikker, a corporation of Denmark Application April 23, 1951, Serial No. 222,402

Claims priority, application Denmark April 25, 1950

11 Claims. (Cl. 127—7)

This invention relates to a process and an apparatus for the lixiviation of solid material, e. g. for the extraction of sugar from sugar beet chips.

In processes of this character, it is a well known practice to feed a disintegrated material, such as sugar beet chips, along a trough in one direction by means of helical feeding means, while at the same time maintaining a counterflow of a solvent such as water through said trough.

In carrying out a process of this character, according to one previous proposal, the disintegrated solid material is supplied in a quantity such that it does not fill the entire cross-sectional area swept by the helical feeding means, while at the same time the level of the solvent flowing through the trough is kept so high that the solid material is moved substantially longitudinally of the trough without appreciable rotation and is constantly kept under the surface of the solvent.

According to other proposals, it has been found that a more efficient lixiviation can be obtained if the particles of the solid material are alternately lifted above the surface of the solvent and then re-immersed into the latter. This has been accomplished by using a trough in which considerable free space is present above the helical feeding means, and maintaining a filling of the trough with solid material such that a considerable portion of the solid material will at any time be present above the cross sectional area swept by the helical feeding means. In the operation of an apparatus of this nature, it has been found that particles of the solid material will constantly be lifted, owing to their frictional engagement with the rotating feeding means, from the cross-sectional area swept by the latter to the space above same, while other particles will pass from the said space into engagement with the helical feeding means in the zone of the downward movement of the latter. In this manner, there will be a constant exchange between the particles engaged by the helical feeding means and the particles present above the latter, and since the level of the solvent has at the same time been kept substantially flush with the top of the helical feeding means, it will be understood that each particle will alternately be lifted above the surface of the solvent and then re-immersed into the latter.

Experiments carried out in connection with the present invention have shown that although a distinct improvement of the efficiency of the lixiviation is obtained by the alternate lifting and dipping of the particles, the known method described does not draw the full benefit of this improvement because the lifting and dipping of the particles take place in a too haphazard manner so that some of the particles will not be subjected to the action of the solvent over a sufficient part of their travel through the trough to ensure an efficient lixiviation.

One object of the present invention is to devise a process and apparatus whereby a more efficient control is obtained of the manner in which the particles are lifted above and re-immersed into the solvent during their travel through the trough. Another object of the invention is to control the feeding movement of the disintegrated solid material in such a manner that the filling of the trough with solid material will be substantially uniform at any cross-section thereof so that there will be a minimum of cavities or free passages through the mass of disintegrated solid material, through which the solvent may pass ineffectively.

With these and other objects in view, according to one feature of the invention, disintegrated solid material is caused to be screwed in the form of a substantially uniformly and closely packed body from one end of a trough to the other end thereof, while simultaneously maintaining a counterflow of solvent over a lower part only of the cross-sectional area of said body.

Hereby it is obtained that any particle of the solid material is caused to follow a substantially regular helical path through the trough, whereby it is alternately lifted above the surface of the solvent and re-immersed into the latter in a uniform and regular manner which is under perfect control.

It has also been found, according to the invention, that to ensure a maximum efficiency of the lixiviation, the particles of the solid material should not, during their travel through the trough, be present above the surface of the solvent for periods so long that the equalization of the concentration of the material to be extracted between the outer and inner portions of the particles, respectively, is allowed to proceed too far, and with a view to this it is proposed, according to the invention, to so adjust the angular velocity of the screw motion of the said body of disintegrated material with regard to the nature of the solid material under treatment, the size of the individual particles thereof, and the rate of diffusion of the material to be extracted, that the difference between the concentration of that material in the outer and inner portions of the particles is reduced by not more than 10% during the time the particles are located above the surface of the solvent during each revolution.

When the solid material is screwed along the trough in the form of a substantially closely packed body in the manner described, it will of course offer considerable resistance to the flow of the solvent and may have a tendency in places to reverse the direction of the flow of the latter, which of course would reduce the efficiency of the lixiviation by interfering with the regular performance of the counterflow principle. To obviate this drawback, it is proposed, according to the invention, to keep the trough at an inclination such that the surface of the solvent is disposed at a substantially uniform inclination of at least 1:10.

According to a further feature of the invention, where the helical feeding movement of the solid material is caused by helical feeding means rotatable in the trough, it is proposed, in order to keep the cross-sectional area swept by the feeding means constantly and uniformly filled with solid material, to subject the latter to a mechanical pressure tending to urge same into engagement with the helical feeding means and to oppose rotation of the material. This mechanical pressure may e. g. be effected by a wedging action between the feeding means and a wall portion of the trough. By thus subjecting the disintegrated solid material to a mechanical pressure, a more or less automatic adjustment is obtained of the feeding movement with respect to the degree of filling at any particular zone of the trough, because where the filling, or density, is comparatively high, the resistance to rotation of the solid material will be increased, and the axial component of the feeding movement will accordingly also be increased since this axial component depends on the difference between the angular velocity of the feeding means and the material being fed. Conversely, where the degree of filling, or density, is relatively low, the axial feeding movement will be reduced, and in this manner there will be a tendency to an equalization of the degree of filling over the whole length of the trough.

In processes of the character in question, it is frequently desirable that the lixiviation should take place at an elevated temperature. This may of course be obtained by providing a heating jacket around the trough, but according to the invention, it has been found particularly advantageous to proceed in a different manner. In this respect, it is to be observed that at the remote end of the trough where the solid material is discharged, the latter will have a relatively high temperature owing to the treatment it has undergone, and will thus be in a position to heat the solvent entering at this point. Accordingly, the real necessity is to have the solvent heated gradually as it proceeds along the trough and comes into contact with constantly colder particles of the solid material, and to obtain this in a simple and efficient manner, it is proposed, according to the invention, to drain off part of the solvent at at least one point intermediate of the length of the trough, to heat said drained-off solvent, and to re-supply same to the trough at a point in the same operating zone as and at a higher level than the drain-off point.

According to a further feature of the invention, an apparatus for carrying out the process comprises, in combination, a closed trough, helical feeding means extending longitudinally of and rotatable in said trough and having free passage areas between helical feeding surface portions thereof, said feeding means being constructed to occupy substantially the whole of the cross-sectional area of the trough with the exception of a relatively narrow free space over part of the circumference of said feeding means, means for supplying disintegrated material at one end of said trough and for discharging same at the other end thereof, and means for supplying solvent at the last named end and for discharging same at the first named end of said trough.

The said helical feeding means may, according to the invention, advantageously be constructed in the form of a rotor carrying a plurality of feeding elements in the form of mutually spaced helical bands, all running along a common helical surface and leaving free passage areas therebetween for the flow of the lixiviation solvent. The distance between the individual bands and also the pitch of the helical surface along which these bands are disposed should of course be selected with regard to the structure and size of the particles of the material to be treated.

To increase the capacity of an apparatus according to the invention, it may be constructed in the form of a twin apparatus comprising two interengaging feeding rotors in a common trough. This is a distinct advantage over using two independent apparatus, both as regards the space occupied and as regards the distribution of the solid material and the solvent, seeing that in the twin apparatus, according to the invention, a uniform distribution of the solid material and the solvent will automatically be obtained between the working zones of the two interengaging feeding rotors. Of course, it is also possible to further increase the capacity of the apparatus by building more than two feeding rotors into a common trough.

Figure 2:
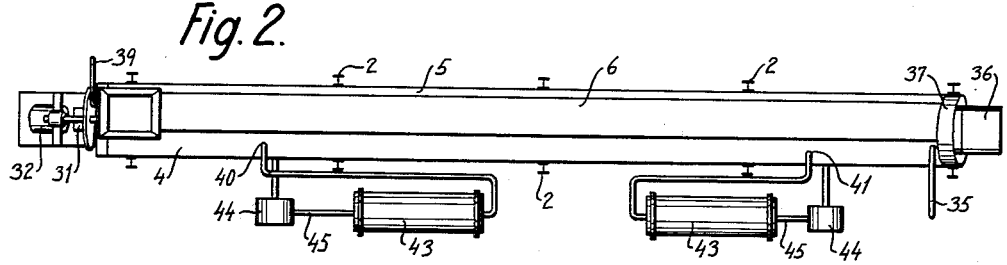
Figure 3:
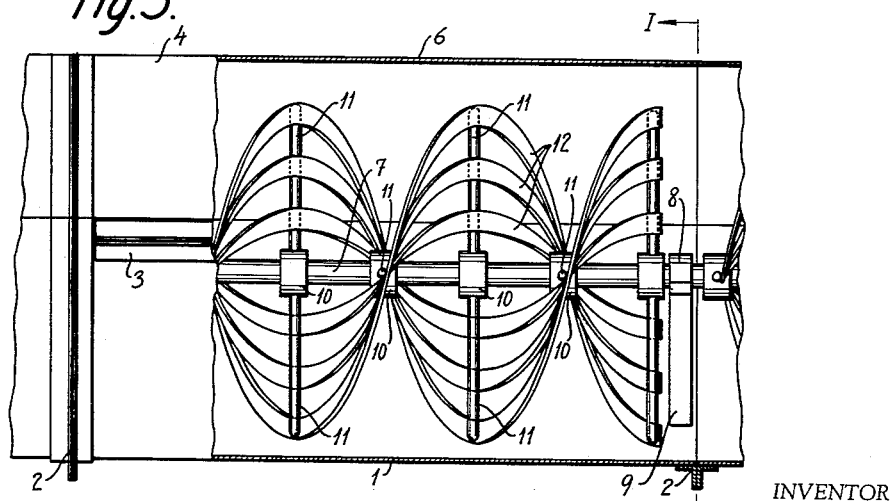

Other advantages and features of the invention will be apparent from the following detailed description of some embodiment with reference to the accompanying drawing in which:

Fig. 1 is a side view of a lixiviation apparatus constructed in accordance with the principles of the invention, Fig. 2 a plane view of same, Fig. 3 on a larger scale part of the lixiviation trough in side elevation with parts in section.

Fig. 4 a cross section along the line I—I of Fig. 3,

Fig. 5 part of a lixiviation trough with two feeding rotors, in plane view, and

Fig. 6 a cross-section along the line VI—VI of Fig. 5.

The lixiviation trough shown in Figs. 1–4 consists mainly of a semi-circular bottom part 1 reinforced by means of channel bars 2 and 3, Figs. 3 and 4, and a top part 4, 5 seated on the channel bars 3 running along the top edge of the bottom part. At its top the trough is closed by means of a cover 6. A shaft 7 extends longitudinally through the trough and carries feeding members 11 to be described in more detail hereinafter. At one end the shaft 7 is rotatably mounted in a bearing 30 and is coupled to a motor 32, such as an electric motor, by way of suitable gearing 31. At its other end, the shaft 7 is supported in a bearing 33. The trough is disposed at an inclination, as is clearly seen in Fig. 1.

34 is a supply chute for a disintegrated material such as sugar beet chips from which the sugar juice is to be extracted in the trough 1. The supply chute 34 is arranged at the lower end of the trough 1. At the upper end of the trough there is provided a supply pipe 35 for a lixiviation liquid such as water, and a discharge chute 36 for the disintegrated material which is fed along the trough in counterflow to the lixiviation liquid supplied through the pipe 35, as will be explained in more detail hereinafter.

At the upper end of the trough there is provided a shaft 37 containing a scoop wheel by means of which the lixiviated material is lifted to the discharge chute 36 in well known manner.

Besides at its ends, the shaft 7 is also supported in a plurality of intermediate points by means of bearings 8, Fig. 3, carried by brackets 9 supported on the bottom of the trough.

In the embodiment shown, the feeding members 12 consist of a plurality of bands 12, e. g. three as illustrated in Figs. 3 and 4, all extending along a common helical surface having its axis coincident with that of the shaft 7, the bands being disposed at different diameters of the said helical surface. At a spacing corresponding to the pitch of the helical surface, the shaft 7 carries hubs 10 provided with radially disposed spokes 11 to which the bands 12 are attached.

The top part 4, 5 is confined at its sides by two inclined walls 4 and 5 at the top edges of which the cover 6 is seated. Assuming that the feeding members 12 are turned in the direction of the arrow, in Fig. 4 by means of the motor 32, the disintegrated solid material filled into the trough in a quantity to fill the entire cross-sectional area controlled by the feeding members 12, i. e. substantially the whole of the zone lying between the inner wall of the trough and the circumference of the bands 12, will be moved towards the wall 4 into the space 38, Fig. 4, between the latter and the circumference of the feeding members, and since the said space tapers in the direction of movement, the material will be subjected to a wedging action exerting a mechanical pressure on the material.

Owing to the friction between the material and the wall 4, the said mechanical pressure will oppose the rotation of the material at a force which is the greater, the more compact is the material at any particular point along the length of the trough.

The said mechanical pressure ensures that all material that is lifted above the surface of the solvent and moved through the upper part of the trough is forced back into the zone swept by the feeding means and is then moved down into the solvent again without finding any opportunity of staying in the upper part of the trough. In this manner a regular movement of the material in the circumferential direction is obtained.

The movement of the material in the longitudinal direction of the trough depends on the difference between the speed of rotation of the feeding means and the speed at which the material is caused to be rotated by the feeding means.

The determining factor for the speed of the feeding movement of the material in the longitudinal direction of the trough is the friction between the wall of the trough and the material, and since this friction will be the greater the more the material is compacted within the zone of the trough swept by the feeding means, it will be seen that if the degree of filling or density, of the material varies along the longitudinal direction of the trough, the longitudinal feeding movement of the material will be relatively increased at points where the material is more closely compressed than at other points, whereby the said difference will be eliminated so that the degree of filling or compression, or in other words the density of the material, is kept substantially uniform over the whole length of the trough. This again reduces the danger of the formation, within the mass of the solid material, either of cavities or free passages through which the solvent may flow ineffectively, or of excessively compressed zones offering a so high resistance to the flow of the solvent that this cannot take place at the predetermined rate.

It has been found that in this manner the lixiviation process may be controlled in such a manner that a certain quantity of lixiviation solvent per unit of time will yield a more concentrated extract than could be obtained by means of the known apparatuses.

The extract formed by the lixiviation process is discharged from the trough through a discharge pipe 39, Fig. 1. In order to obtain a heating of the contents of the trough so as to improve the efficiency of the lixiviation process, a portion of the extract is drained off, in the embodiment shown, at points 40 and 41 and conducted through pipes 42 to a heating device 43 in which the extract is heated in any suitable manner, such as by electric or other well known means. After having been heated in the heating device 43, the extract is sucked through a discharge tube 45 by means of a pump 44 and is then supplied through a tube 46 to the trough in approximately the same zone of the latter as that in which the extract was drained off.

The inclination of the trough is preferably so selected that the surface of the lixiviation solvent, or the extract formed by the action of the latter on the solid material, falls uniformly along the trough at substantially the same inclination as that of the trough. This inclination is adjusted with regard to the compression of the material taking place in the trough and controlling the speed at which the extract flows through the trough. Hereby it can be obtained that the extract distributes itself at an approximately constant level above the bottom of the trough at any point thereof, and at an inclination that should preferably be at least 1:10 in order to ensure that the solid material cannot in any zone of the trough reverse the direction of flow of the solvent or extract owing to its feeding movement along the trough.

The embodiment of Figs. 5 and 6 differs from that of Fig. 1 mainly in that the lixiviation trough is composed of two single troughs 1 and 101 arranged side by side without a partition therebetween, thus forming in effect a twin trough. Each of the component troughs 1 and 101 contains a number of helical feeding means 12 and 112 of similar construction as in Figs. 1–4. The largest diameter of these feeding means is so great that the part of these feeding means 12 and 112 having the largest diameter engage between one another, thereby effectively preventing the disintegrated material being lixiviated from being carried directly round by the feeding means without being appreciably conveyed longitudinally of the trough.

Similarly as in Figs. 1–4 the feeding rotor 12 is mounted on a shaft 7 coupled to a motor 32, Fig. 1. The feeding rotor 112 is attached to a shaft 107 rotatably mounted in the trough 101 by means of a hub 110 and spokes 111, and at one end of the trough the two shafts 7 and 107 are coupled together by means of suitable gearing 50, 51, Fig. 5.

It is observed that the process and apparatus of the present invention are applicable not only to the above mentioned lixiviation of sugar beets, but may also be used with advantage for many other instances of the lixiviation of vegetable, animal, or mineral material, e. g. in the medical industry or for the extraction of potassium salts from certain so-called mineral beets. Moreover, the invention is also applicable for the extraction from vegetable material of constituents of odour and taste.

I claim:

1. A method for the continuous countercurrent lixiviation of distintegrated material comprising the steps of establishing and maintaining a body of the material in closely packed, but liquid pervious condition and in the geometrical shape of a solid of revolution, supplying fresh material at one end and removing treated materiel from the other end of the said body, rotating said body about its axis, conveying the material longitudinally through the body from the supply end to the discharge end, passing a flow of lixiviating liquid under the influence of gravity in countercurrent to the travel of the material through a section of the body, said section having for a constant speed of rotation of the body a constant location relative to a vertical plane through the axis of rotation.

2. A method for the continuous counter-current lixiviation of distintegrated material comprising the steps of establishing and maintaining a body of the material in closely packed, but liquid pervious condition and in the geometrical shape of a solid of revolution, supplying fresh material at one end and removing treated material from the other end of the said body, rotating said body about its axis, conveying the material longitudinally through the body from the supply end to the discharge end, subjecting the surface of said body in one angular range of its said rotation to pressure having a component at right angles to the axis of said rotation, passing a flow of lixiviating liquid under the influence of gravity in counter-current to the travel of the material through a section of the body, said section having for a constant speed of rotation of the body a constant location relative to a vertical plane through the axis of rotation.

3. A method as in claim 1 in which the angular velocity of the said rotation is so adjusted that in each particle of the material to be treated, the difference between the concentration in its inner portion and its outer portion of the substance to be extracted is reduced by not more than 10% in the interval of time during each revolution, in which the particle in question is located above the level of the extraction agent.

4. An apparatus for the lixiviation of a disintegrated solid material comprising a closed, oblong trough, having at opposite ends thereof an inlet and an outlet respectively for said material, a screw conveyor extending longitudinally through said trough and having helical conveying blades, means for rotating said conveyor within said trough to advance said material in a closely packed, however liquid penetrable condition from said inlet to said outlet, means for supplying a liquid extraction agent to said trough at the end of same where said outlet is located, means for discharging the said liquid at the opposite end of the trough, and passage areas for said agent in the said helical conveying blades, the said helical conveying blades consisting in a plurality of mutually spaced helical bands running along a common helical surface.

5. An apparatus for the lixiviation of a disintegrated solid material comprising a closed oblong trough, having at opposite ends thereof an inlet and an outlet respectively for said material, a series of screw conveyors coaxially and rotatably mounted in said trough at spaced intervals one behind the other to extend longitudinally through said trough, means for rotating said screw-conveyors, to advance said material in a closely packed, however liquid penetrable condition from said inlet to said outlet, means for supplying a liquid extraction agent to said trough at the end of same where said outlet is located, means for discharging said liquid agent from the trough at the opposite end of same, and free passage areas for said liquid agent in the helical conveying surfaces of said screw conveyors, each said conveyor comprising a plurality of spaced helical bands running along a common helical surface.

6. An apparatus according to claim 5 in which the helical bands of each of the screw-conveyors are each extended over not less than a full pitch of the helical surface of the screw conveyor.

7. An apparatus for the lixiviation of a disintegrated solid material comprising a closed oblong trough, having at one end an inlet for said material and an outlet for a liquid extraction agent and at the opposite end an outlet for the said material and an inlet for said liquid agent, and having a substantially semi-cylindrical bottom portion and a top portion comprising upwardly converging side-walls extending from the upper edges of said bottom portion to provide for an upwardly tapering space between one of said walls and the outer extremity of the conveyor, a screw conveyor rotatably mounted in said semi-cylindrical bottom portion of the trough and comprising a plurality of mutually spaced helical bands running along a common helical surface, means for rotating said conveyor within said trough to advance said material in a closely packed, however liquid penetrable condition from said inlet to said outlet and means for supplying a liquid extraction agent to said trough in the region of said outlet.

8. An apparatus according to claim 7 in which the screw conveyor the axis of rotation of which being parallel to the axis of the semi-cylindrical portion of the trough is located eccentrically relatively to said portion of the trough.

9. An apparatus according to claim 8 in which the wall of the bottom portion of the trough fits snugly around the adjacent combined outer extremity of the two screw-conveyors and in which the longitudinally located side walls of the upper portion of said trough converge upwardly to provide for an upwardly tapering free space between each of said side walls and the outer circumference of the adjacent portion of the screw conveyor facing said wall.

10. An apparatus according to claim 7 in which the axis of revolution of the conveyor is parallel to the axis of the semi-cylindrical portion of the trough and located at a level below the level of the last-mentioned axis.

11. An apparatus for the lixiviation of disintegrated solid materials comprising a closed oblong trough having at one end an inlet for said material and an outlet for a liquid extraction agent and at the opposite end an outlet for the said material and an inlet for said liquid agent, two screw conveyors rotatably mounted in and extending side by side longitudinally of said trough so as to engage between one another in an overlapping zone of said conveyors, comprising each a helical conveying blade consisting of a plurality of mutually spaced helical bands running along a common helical surface, and means for rotating said screw conveyors.

References Cited in the file of this patent

UNITED STATES PATENTS

| | | |
|---|---|---|
| 755,546 | Rak | Mar. 22, 1904 |
| 1,006,311 | Steffen | Oct. 17, 1911 |
| 1,961,420 | Hildebrandt | June 5, 1934 |
| 2,203,666 | Bonotto | June 11, 1940 |
| 2,268,905 | Schaub et al. | Jan. 6, 1942 |
| 2,517,833 | Bourland | Aug. 8, 1950 |
| 2,600,871 | Helwig | June 17, 1952 |